United States Patent
Briscese

[11] Patent Number: 5,984,340
[45] Date of Patent: Nov. 16, 1999

[54] TRAILER

[76] Inventor: Emanuele Briscese, P.O. Box 348, Notre-Dame de Lourdes, Manitoba, Canada, R0G 1M0

[21] Appl. No.: 08/906,905

[22] Filed: Aug. 6, 1997

[51] Int. Cl.⁶ .................................................. B60G 11/20
[52] U.S. Cl. .................................... 280/414.5; 280/43.23; 280/656
[58] Field of Search ..................... 280/414.5, 43, 280/43.11, 43.17, 43.18, 43.22, 43.23, 638, 656

[56] References Cited

U.S. PATENT DOCUMENTS

| | | | |
|---|---|---|---|
| 2,478,795 | 8/1949 | Whalen et al. ........................ | 280/414.5 |
| 2,566,393 | 9/1951 | Wolfe ................................... | 280/414.5 |
| 2,766,050 | 10/1956 | Stone ................................... | 280/43.17 |
| 2,807,381 | 9/1957 | Tegeler ................................. | 280/414.5 |
| 3,062,558 | 11/1962 | Krolicki ............................... | 280/414.5 |
| 3,557,980 | 1/1971 | Klaus ................................... | 280/656 |
| 3,722,948 | 3/1973 | Walsh et al. .......................... | 280/656 |
| 3,746,195 | 7/1973 | Beilke et al. . | |
| 3,788,675 | 1/1974 | Wilander . | |
| 3,807,593 | 4/1974 | Bourton . | |
| 3,831,210 | 8/1974 | Ow ...................................... | 280/43.18 |
| 4,058,325 | 11/1977 | Schramm . | |
| 4,065,825 | 1/1978 | Cohen . | |
| 4,098,347 | 7/1978 | Honnold ............................... | 280/656 |
| 4,128,258 | 12/1978 | Johnson ................................ | 280/656 |
| 4,168,932 | 9/1979 | Clark . | |
| 4,317,593 | 3/1982 | Sarvela . | |
| 4,415,300 | 11/1983 | Boddicker . | |
| 4,490,089 | 12/1994 | Welker . | |
| 4,595,210 | 6/1986 | Groeing .............................. | 280/414.5 |
| 4,673,328 | 6/1987 | Shiels . | |
| 4,711,499 | 12/1987 | Fortin . | |
| 4,813,841 | 3/1989 | Eischen . | |
| 4,854,805 | 8/1989 | Althoff et al. . | |
| 4,968,210 | 11/1990 | Friederich . | |
| 5,161,814 | 11/1992 | Walker ................................. | 280/414.5 |
| 5,354,090 | 10/1994 | Grovom ............................... | 280/656 |

FOREIGN PATENT DOCUMENTS

| | | |
|---|---|---|
| 0199652 | 10/1986 | European Pat. Off. . |
| 58/78836 | 5/1983 | Japan . |
| 2043556 | 10/1980 | United Kingdom . |

Primary Examiner—Kevin Hurley
Attorney, Agent, or Firm—Adrian D. Battison; Murray Thrift

[57] ABSTRACT

A vehicle arranged for raising and lowering the frame relative to the ground wheels for loading comprises a vehicle frame with a hitch at a forward end of the frame and at least two ground wheels for supporting the frame for movement across the ground. Each wheel has a mounting assembly providing driven rotation of a hub carrying the wheel spindle from a raised height of the wheel to a lower locked position. The hub has an internal gear which is driven by a hydraulic motor driving a pinion. The hub can rotate through 180 degrees from a top dead canter to a position just beyond bottom dead center where it engages a stop to support vertical loads. Twisting of the hub and a parallel support plate are prevented by interlocking the members at the bottom position.

14 Claims, 7 Drawing Sheets

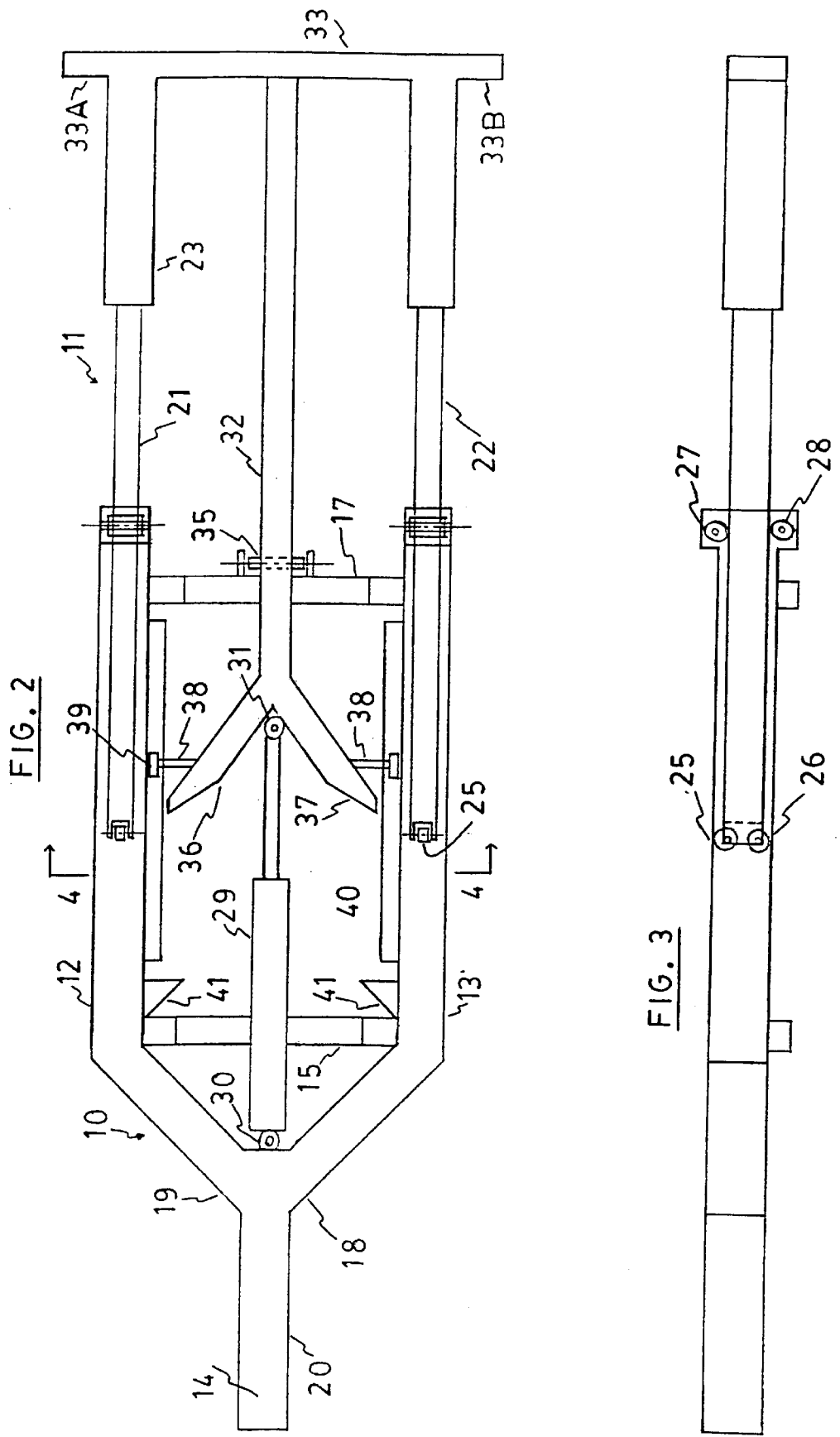

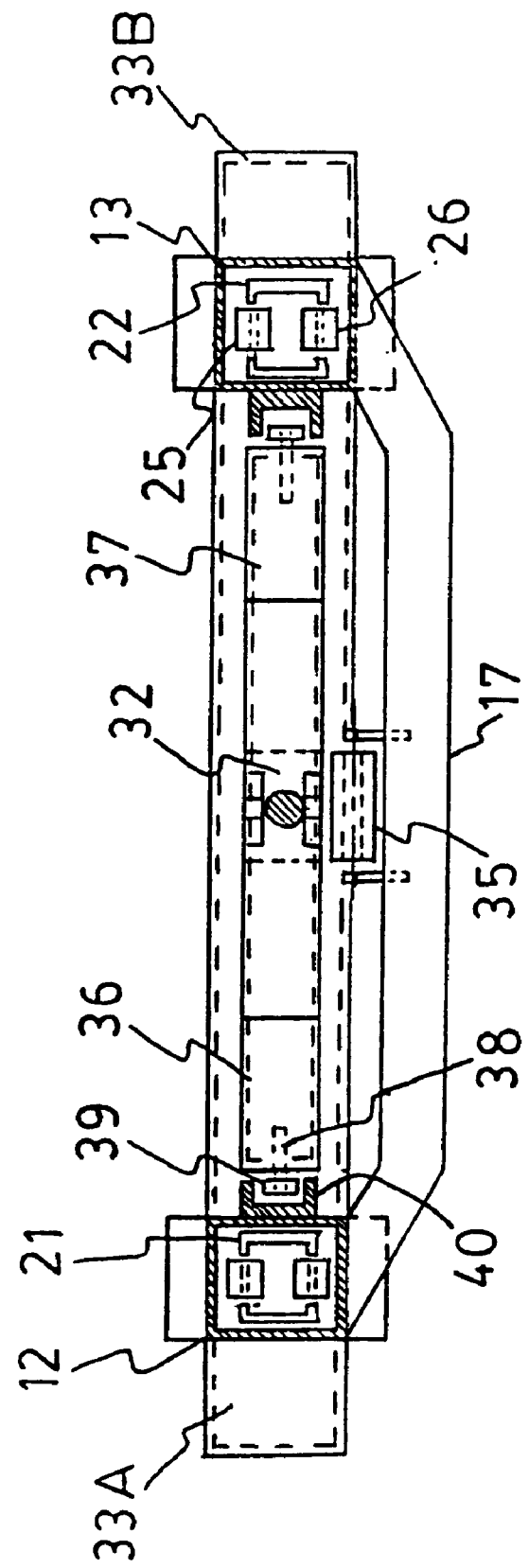

TRAILER

This invention relates to a trailer of an improved construction relative to conventional trailers.

SUMMARY OF THE INVENTION

It a first object of the invention to provide an improved trailer which allows movement of the trailer from a raised transport position to a lowered loading/unloading position in which the frame of the trailer is moved to be at or adjacent to the ground.

It is second object of the present invention to provide an improved trailer construction a length of the trailer can be adjusted to accommodate different loads.

According to one aspect of the invention there is provided a trailer comprising;

a trailer frame having at least two longitudinal beams parallel to a direction of movement of the trailer;

a hitch at a forward end of the frame for attachment to a towing vehicle;

at least two ground wheels for supporting the frame for movement across the ground;

and at least two mounting assemblies each associated with a respective ground wheel for attaching the ground wheel to the frame;

each mounting assembly comprising:

a first member connected to the frame for movement therewith;

and a second member having the wheel mounted thereon for rotation about a wheel axis;

the second member being movably mounted on the first member so as to move the wheel axis from a first raised position in which the frame is lowered to a position at or adjacent the ground to a second operating position lower than the first position in which the frame is raised for transport.

Preferably the second member is mounted on the first member for rotation about a rotation axis with the wheel axis being parallel to the rotation axis and offset to one side thereof.

Preferably the second member carries a gear and wherein the first member carries a pinion driven by a motor for rotating the gear and thus rotating the second member directly to the first member.

Preferably the motor is a hydraulic motor although an electric motor could also be used.

Preferably the first member comprises a substantially vertical plate and wherein the second member is mounted on the plate outside of the plate and wherein the motor is mounted inwardly of the plate with the shaft of the motor passing through the plate for engaging the gear on the outside of the plate.

Preferably the second member comprises a hub having a main hub plate parallel to the plate of the first member with an annular rim attached to the plate and projecting inwardly therefrom, the gear being defined on a surface of the annular rim facing toward the axis such that the pinion engages the gear for rotating the hub.

Preferably there is provided a spindle for the wheel mounted on an outside surface of the plate of the second member.

Preferably the first raised position the wheel axis is substantially directly above the rotation axis and wherein the second operating position the wheel axis moves to a position just beyond a bottom center position.

Preferably there is provided on the first member a stop for locating the second member with the wheel axis in the bottom position just beyond the center such that vertical loads on the wheel tend to push the second member against the stop.

Preferably the second member comprises a hub having a main hub plate parallel to the plate of the first member and wherein there is provided interengaging elements on the main hub plate and the plate for preventing twisting of the hub plate away from the plate.

According to a second aspect of the invention there is provided a trailer comprising;

a trailer frame having at least two longitudinal beams parallel to a direction of movement of the trailer;

a hitch at the forward end of the trailer for attachment to a to a towing vehicle;

at least two ground wheels for supporting the frame for movement across the ground;

and at least two mounting assemblies each associated with a respective ground wheel for attaching the ground wheel to the frame;

wherein the frame comprises;

a first frame portion having a first and second beam portion;

a second frame portion having a first and a second beam portion;

each of the first and second beam portions of the first frame portion comprising a hollow tube with an open end;

each of the first and scanned beam portions of the second frame portion extending into the open end of a respective one of the first and second beam portions of the first frame portion;

and means for allowing sliding movement of the first and second beam portions of the second frame portion relative to the first frame portion for adjusting the length of the frame.

Preferably the sliding movement is allowed by rollers.

Preferably the end of each of the first and second beam portions of the second frame portion includes a pair of rollers for engaging upper and lower surfaces respectively of the beam portion of the first frame portion and wherein the end of the first and second beam portions of the first frame portion have rollers there on for engaging the upper and lower surfaces respectively of the respected beam portion of the second frame portion.

Preferably the second frame portion has a third beam parallel to the first and second beam portions, the third beam having means thereon for rolling on a support provided by the first frame portion.

Preferably the third beam has a pair of transverse members extending transversely toward the first and second beam portions respectively, each of the transverse members having means thereon for rolling on a support attached to a respective on of the first and second beam portions of the frame portion.

Preferably the transverse members form with the third beam in plan view a Y-shape.

Preferably each of the transverse members has a transversely extending roller thereon for engaging into a track carried on a inside surface of a receptive one of the first and second beam portions.

Preferably the first frame portion includes a transverse beam for engaging and supporting the third beam.

Preferably a hydraulic cylinder or electrical actuator connected between the first and second frame portions effects said sliding movement.

BRIEF DESCRIPTION OF THE DRAWINGS

One embodiment of the invention will now be described in conjunction with the accompanying drawings in which:

FIG. 2 is a top plan view of a center portion only of the frame of FIG. 1 showing the frame in an extended position.

FIG. 3 is a side elevational view of the frame portion of FIG. 2.

FIG. 4 is a cross sectional view along the lines 4—4 of FIG. 2.

In the drawings like characters of reference indicate corresponding parts in the different figures.

DETAILED DESCRIPTION

Figure 1:
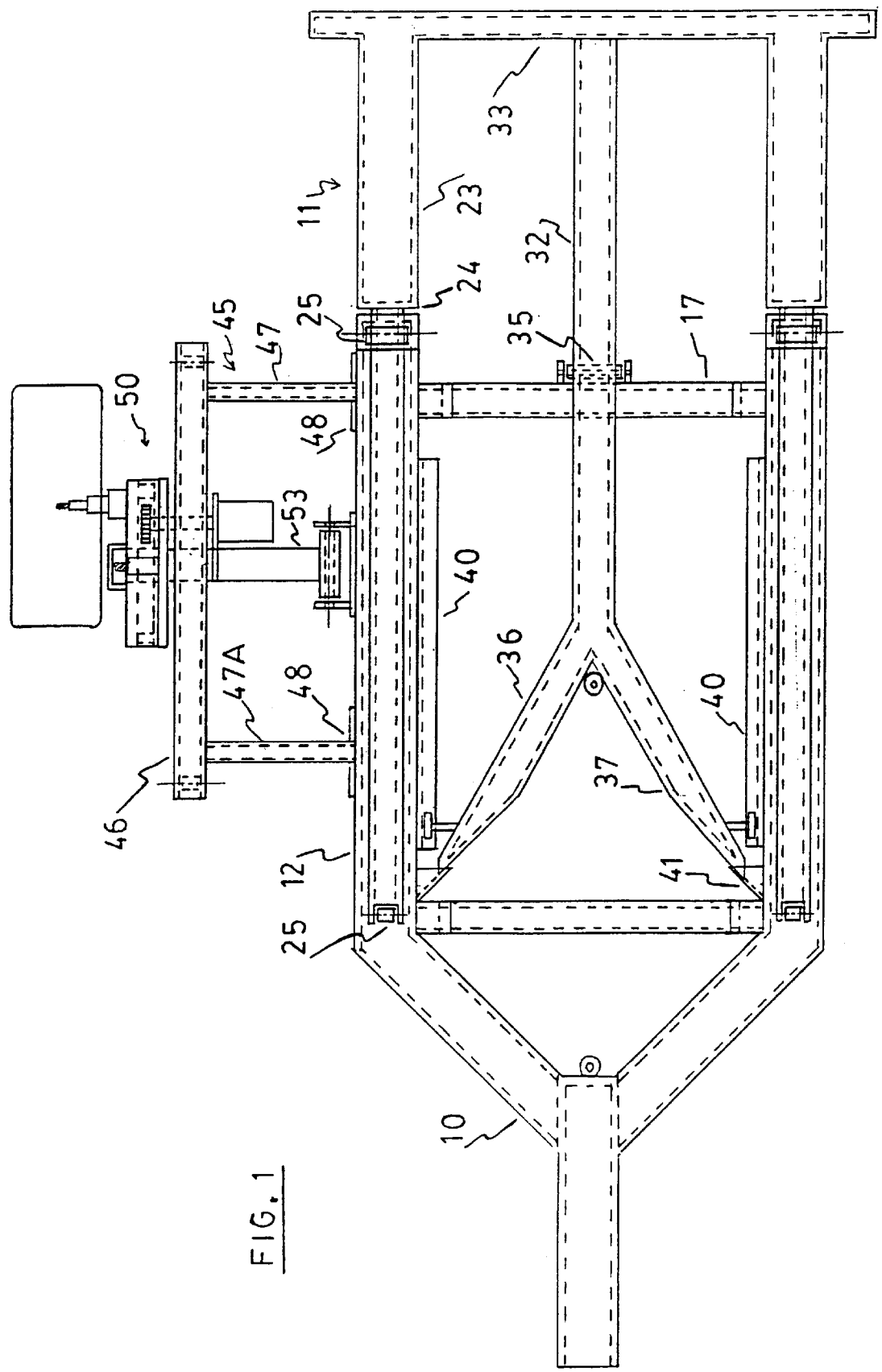
FIG. 1 is a top plan view of the trailer according to the present invention with one side portion of the frame and the associated wheel thereon omitted for convenience of illustration.

The frame of the embodiment comprises a first frame portion 10 and a second frame portion 11 which can be adjusted from an inwardly closed shorter position shown in FIG. 1 to an extended position shown in FIG. 2.

The first frame portion 10 comprises a first beam 12 and a second beam 13 which are parallel and parallel to a direction of longitudinal movement of the trailer as indicated at 14. The beams 12 and 13 are indicated by a first transverse beam 15 and a second rear transverse beam 17. At the front of the beams 12 and 13 is provided a pair of inwardly inclined beam portions 18 and 19 which converge to central apex at which is provided a hitch pole 20 extending forwardly from the frame for attachment to a towing vehicle.

The rear or second frame portion comprises a first beam 21 and a second beam 22. Each of first and second beams 21, 22 is formed of a first tubular portion 23 of the same dimensions as a tubular portion forming the beam 12,13 and a second tubular portion of reduced dimensions for sliding inside of the tubular portion defining the beam 12,13. Thus in the retracted position shown in FIG. 1, the end 24 of the portion 23 lies substantially immediately adjacent the end 25 of the beam 12. The beam 13 and the corresponding beam 22 of the second portion of the same construction.

At the forward end of the smaller beam portion of the rear frame is provided a pair of guide rollers 25, 26 which roll on the inside surfaces of the top and bottom wall of the beam 12, 13 as best shown in FIG. 3.

At the rear end of the beams 12 and 13 is provided a pair of rollers 27, 28 which roll on the outside surface of the smaller portion of the beams 21, 22. Thus the smaller portions of the beam 21 and 22 are guided by the pair of roller as best shown in FIG. 3 for sliding movement longitudinally of the beams 12, 13.

The longitudinal sliding movement of the rear portion 11 or of the front portion 12 is then effected by a cylinder schematically indicated at 29 which is connected between a coupling 30 at the rear end of the hitch pole 20 and a coupling 31 on the rear frame portion 11.

The rear frame 11 further includes a third beam 32 parallel to and coplanar with the beams 21 and 22. The three beams are indicated by a transverse rear beam 33 defining a rear part of the frame with the rear beam extending outwardly beyond the beams 21 and 22 to form projecting portions 33A and 33B. The third beam 32 rides on a roller 35 carried on a rear upper part of the transverse beam 17. Forwardly the roller 35, the beam 32 splits into two transverse members 36 and 37 which diverge outwardly in a Y-shape toward the beams 12 and 13. Adjacent the forward end of each of the transverse members is provided a horizontal shaft 38 each of which carries a roller 39 running within a channel guide track 40 mounted on an inwardly facing surface of the respective beam 12, 13. Thus the forward end of the third beam is guided by the tracks 40 and is supported against vertical movement relative to the front frame portion 10. The coupling 31 is located at the apex between the legs of the Y-shape.

In this way the length of the frame can be adjusted from the position shown in FIG. 1 which is the short position to the extend position shown in FIG. 2. During this movement the position of the beams of the frame are maintained in forward position so that the frame remains coplanar and is structurally sound. In the retracted position shown in FIG. 2, the pointed end of each of the transverse member 36, 37 engages into a triangular receptacle 41 carried on the inwardly facing surface of the beam 12, 13.

The central frame section defined by the front portion 10 and the rear portion 11 is supplemented by a pair of side frame portion generally indicated at 45. The right hand frame as shown in FIG. 1 but the left hand frame is omitted for convenience of illustration. Each frame portion comprises a horizontal beam 46 which is supported on the respective beam 12, 13 by a pair of inclined support struts 47, 47A. Each of the struts 47, 47A is attached to a plate 48 at its inner end bolted to the outside surface of the beam 12. Thus the beam 46 is supported at a height raise from the horizontal plane of the main frame. The beam 46 is however rigidly attached to the main frame and remains in fixed position relative to thereto.

The frame thus constructed by a pair of wheel assemblies generally indicated at 50. Again the right hand wheel assembly is shown in FIG. 1 and the left hand wheel assembly is omitted for convenience of illustration. It will be appreciated that the frame portion 45 and the wheel 50 of the right is symmetrical relative to the same elements on the left hand side.

The wheel assembly 50 comprises a ground wheel 51, a wheel mounting assembly 52, a pivot arm 53 and a leaf spring 54.

The pivot arm 53 is pivotally connected by a bracket 55 attached to the beam 1 by a plate 56 intermediate the plate 48. The arm 53 can thus pivot upwardly and downwardly in a suspension movement of the wheel against the bias of the spring 54 attached to the beam 46 by couplings 54A.

Other types suspension can be used depending upon requirements and the present invention is not limited to the particular type of suspension shown and described herein.

The arm 53 projects beyond its connection to the base of the leaf spring 54 and thus provides a support for the wheel mounting 52. The wheel mounting 52 comprised a first member 60 in the form of a substantially vertical plate welded to an outer end 61 of the arm 53 and standing upwardly therefrom so the arm is attached to the bottom of the plate 60. The plate carries a spindle 62 projecting forwardly from the plate at a position directly above the arm and extending horizontally from the plate when the plate stands vertical. The angle of the plate varies during suspension movement.

The mounting assembly 52 further includes a hub 63 forming a second member of the mounting assembly which is movable relative to the first member. The hub 63 includes a central ring 64 mounted on the spindle 62 for rotation about a rotation axis 65 defined by the spindle 62. The hub 63 carries a spindle 66 for the wheel 51 defining a wheel axis 67 about which the wheel rotates on the spindle 65. The spindle 65 is located either position spaced from the spindle 62 with the axis 65 and 67 parallel.

The hub 63 includes and outer ring 68 surrounding the axis 65 with the outer ring including an inwardly facing gear 69. A pinion 70 is mounted on a shaft 71 extending through the plate 60 and carried thereby on suitable bearings. The shaft 71 is parallel to the axis 65 and drives the pinion in rotation about the axis of the shaft so as to drive the gear 69 in rotation around the axis 65. The shaft 71 is driven by a hydraulic motor 72 carried on a support plate 73 attached to the arm 53 of a position thereon spaced from the plate 60 and inwardly of the spring 54. The plate 73 is based by a triangular base 74.

Figure 5:
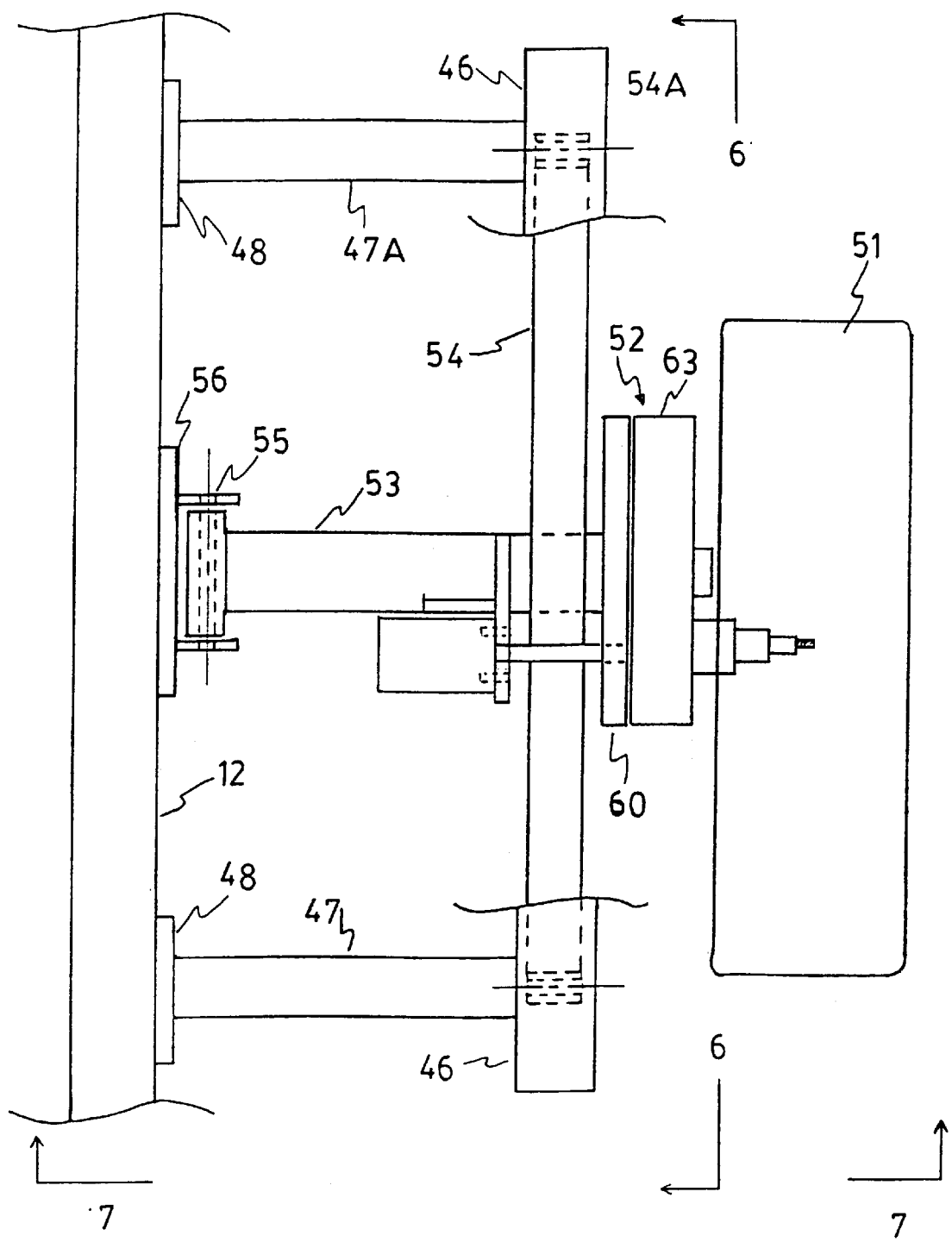
FIG. 5 is a top plan view, partly broken away, of the side portion only of the frame of FIG. 1 on an enlarged scale showing particularly the wheel mounting assembly.
Figure 6:
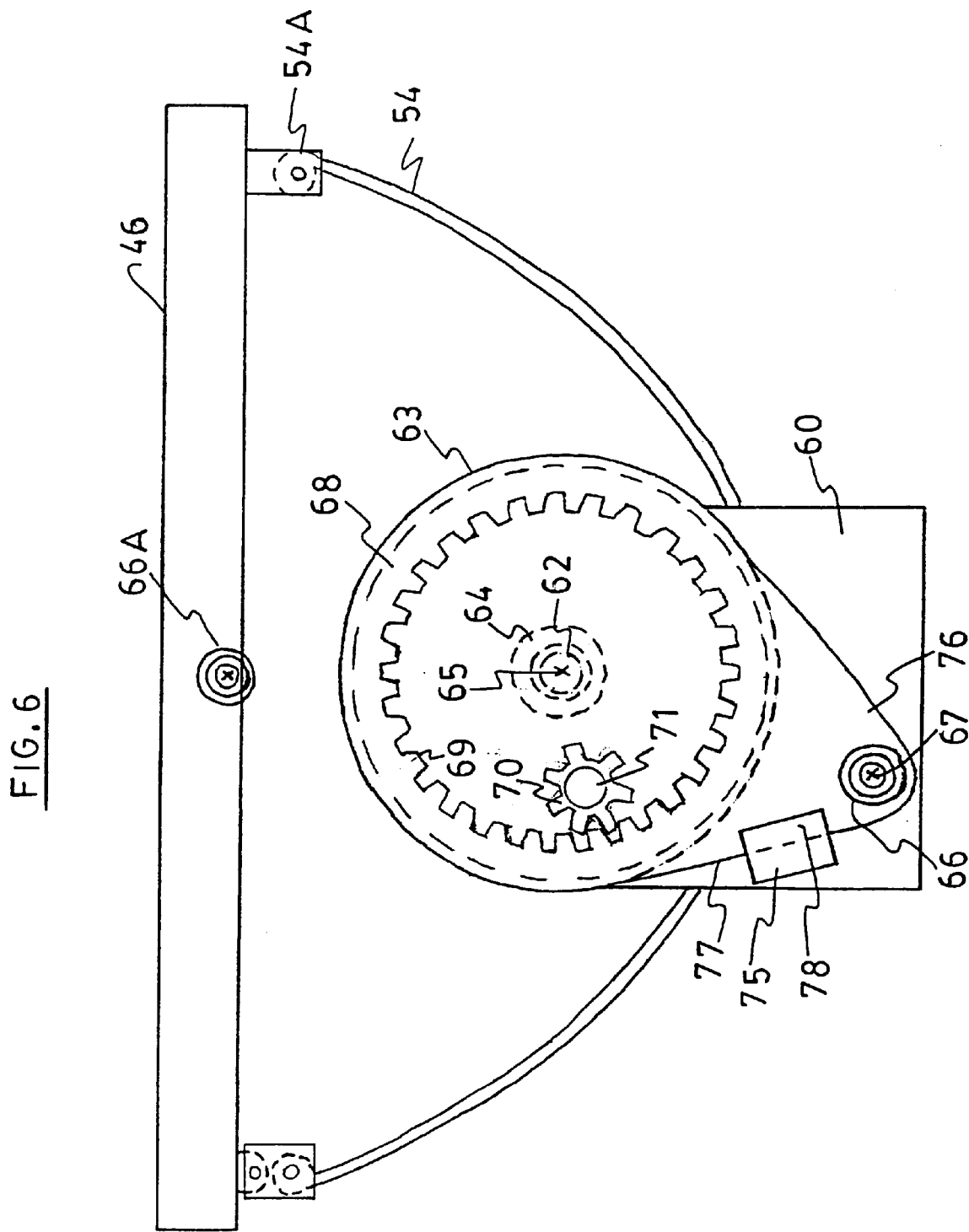
FIG. 6 is view along the lines 6—6 of FIG. 5.
Figure 7:
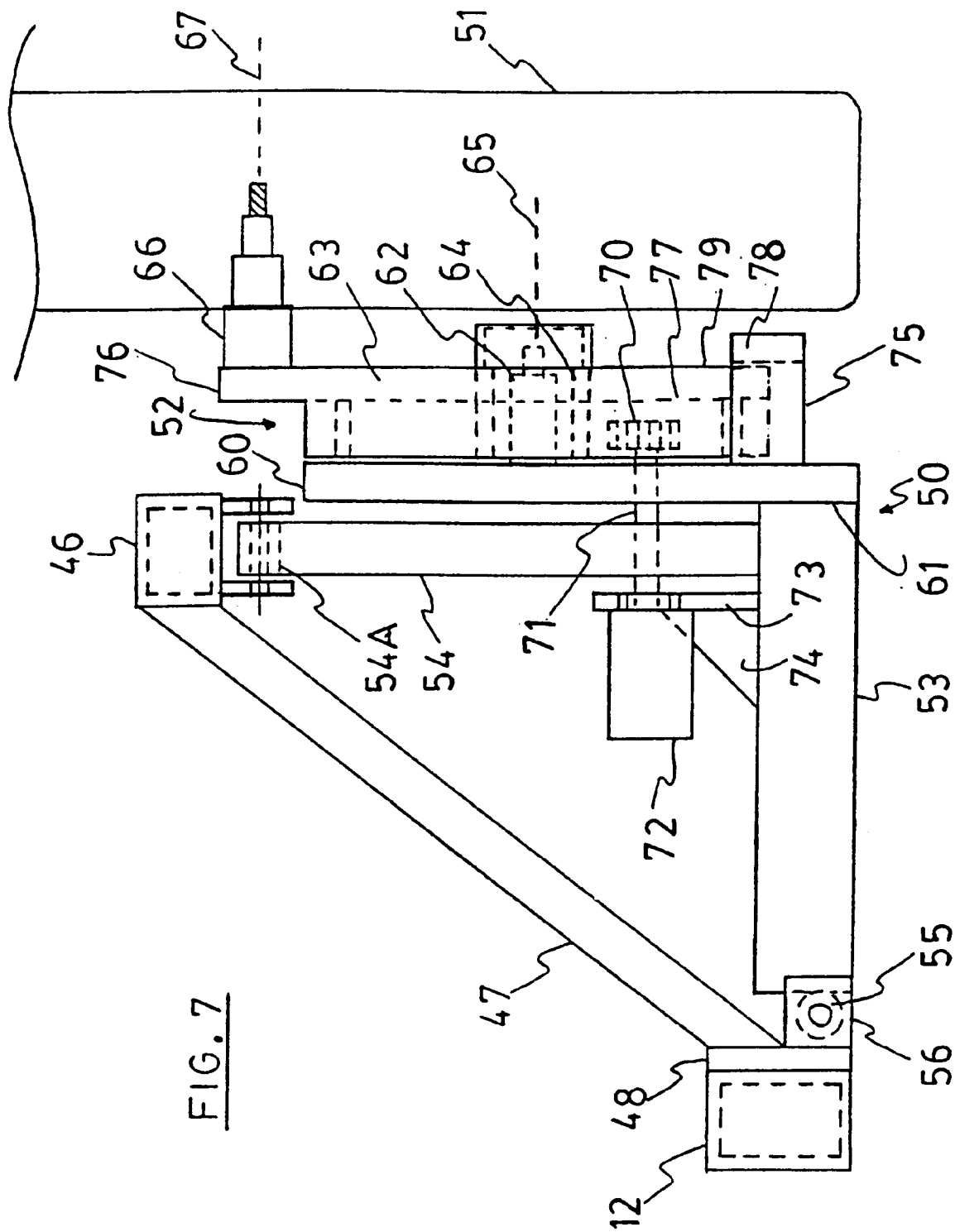
FIG. 7 is a view along the line 7—7 of FIG. 5 showing the wheel mounting assembly in the first raised position of the wheel axis.
Figure 8:
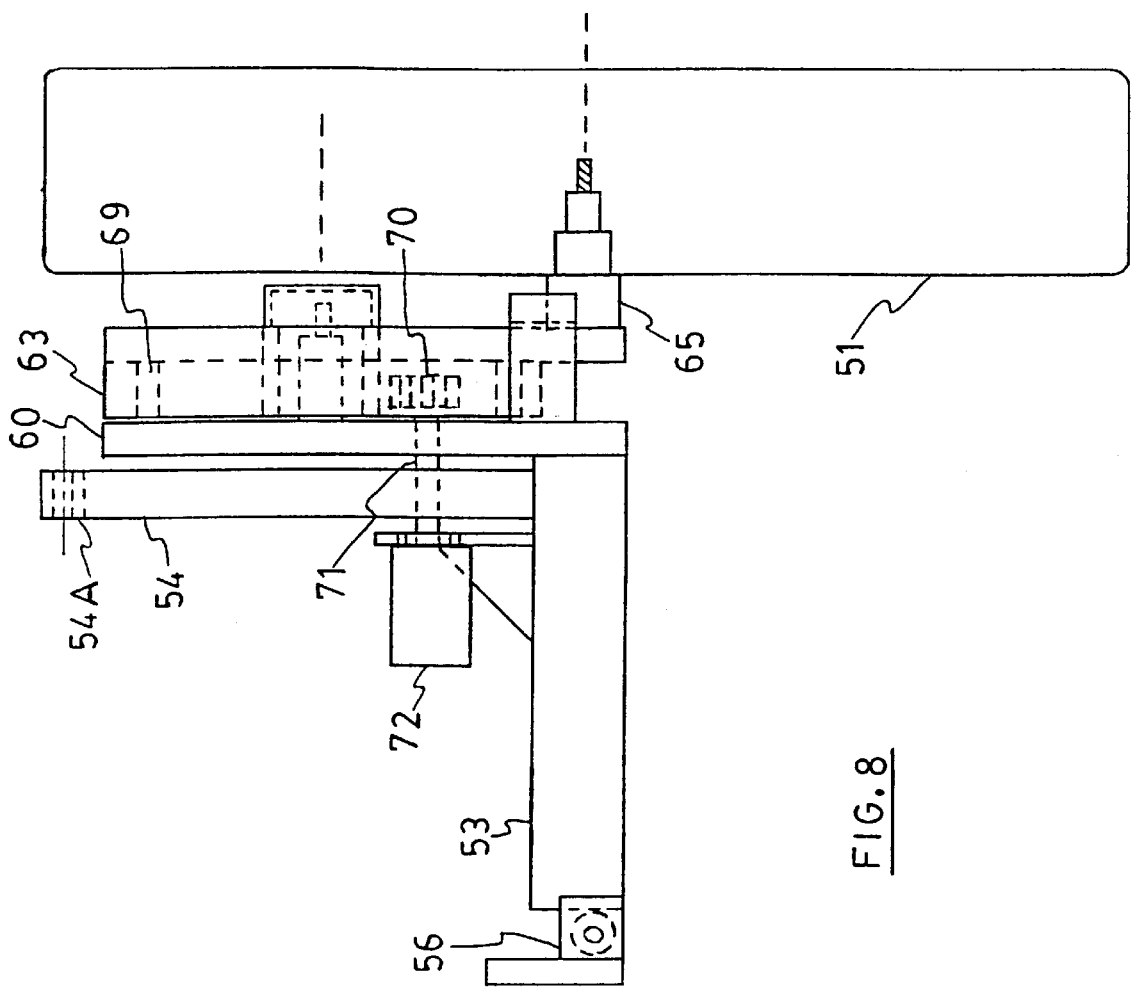
FIG. 8 is a view similar of FIG. 7 showing the mounting assembly in the second lowered position of the wheel axis.

Rotation of the shaft 71 effected by the hydraulic motor 72 thus causes the pinion to drive the hub 63 around the axis 65 from the first raised position of the spindle 66 as shown in FIG. 7 to the second lowered position of the spindle 66 as shown in FIGS. 5, 6 and 8.

In the raised position of the spindle 66 as shown in FIG. 7, the spindle is moved to a top center position directly above the axis 65. In this position the wheel 51 is raised relative to the frame. The wheel 51 has a diameter arranged that such that in raised position shown in FIG. 7 the frame is substantially at or adjacent ground height so that a load can be moved directly on to the trailer. The spindle 66 tends to center itself over the axis 65 due to the loading of the wheel on the hub 63 which tend to pull the hub upwardly in rotation relative to the plate 60.

When the trailer is loaded, the motor 72 is actuated to drive the shaft 71 causing the pinion the drive the gear in a direction rotating the hub 63 from the 12 o'clock position illustrated in dotted line at 66A in FIG. 6 to the 6.30 position shown in full line in FIG. 6. Thus the spindle 66 in the lowered position goes just beyond the bottom centered position that is slightly over-center until the hub 63 engages against a stop 75 carried on the plate 60. Thus the hub 63 includes a lobe 76 projecting outwardly to one side of the ring 68 with the lobe defining a side wall 77 which engages against the stop 75. The stop forms a surface which is oriented to engage the surface 77 when the lobe moves to the required position holding the spindle 66 at the 6.30 position.

In addition the stop 75 includes an end plate portion 78 projecting beyond a front face 79 of the hub 63. The end plate portion 78 defines a lip which is in sliding contact with the front face 79 so as to hold that front face against movement away from the plate 60. The lip 78 thus takes loading from the spindle 62 and insures that excessive loading on the spindle 65 tending to twist the bottom of the hub away from the plates 60 is resisted by the inter-engagement between the lip 78 and the surface 79.

The trailer therefore the present invention allows the frame of the trailer to be lowered to the ground for loading and the frame of the trailer to be lifted for transport. The lifting action is effected using hydraulic action without operator involvement in latching or unlatch elements.

In addition the trailer can be adjusted in length to accommodate different loads with the whole of the frame including the adjustable rear portion being movable in the vertical direction for the loading action.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A vehicle comprising;

a vehicle frame having at least two longitudinal beams parallel to a direction of movement of the vehicle;

at least two ground wheels for supporting the frame for movement across the ground;

and at least two mounting assemblies each associated with a respective ground wheel for attaching the ground wheel to the frame;

each mounting assembly comprising:

a first member connected to the frame for movement therewith;

and a second pivot member having the wheel mounted thereon for rotation about a wheel axis;

the second pivot member being pivotally movably mounted on the first member for pivotal movement relative thereto about a rotation axis parallel to and spaced from the wheel axis so as to move the wheel axis from a first raised position in which the frame is lowered to a position at or adjacent the ground to a second operating position lower than the first position in which the frame is raised for transport;

and means for actuating said pivotal movement between the raised position and the second operating position, the actuating means being arranged such that in the first raised position the wheel axis is substantially directly above the rotation axis and in the second operating position the wheel axis is moved through an angle substantially equal to 180 degrees such that the wheel axis is substantially directly below the rotation axis.

2. The vehicle according to claim 1 wherein the first member comprises a plate and the second member comprises a hub having a main hub plate parallel to the plate of the first member and wherein there is provided inter-engaging elements on the main hub plate and the plate for preventing twisting of the hub plate away from the plate when in the second operating position.

3. A vehicle comprising:

a vehicle frame having at least two longitudinal beams parallel to a direction of movement of the vehicle:

at least two ground wheels for supporting the frame for movement across the ground;

and at least two mounting assemblies each associated with a respective ground wheel for attaching the ground wheel to the frame;

each mounting assembly comprising:

a first member connected to the frame for movement therewith;

and a second pivot member having the wheel mounted thereon for rotation about a wheel axis;

the second pivot member being pivotally movably mounted on the first member for pivotal movement relative thereto about a rotation axis parallel to and spaced from the wheel axis so as to move the wheel axis from a first raised position in which the frame is lowered to a position at or adjacent the ground to a second operating position lower than the first position in which the frame is raised for transport;

and means for actuating said pivotal movement between the raised position and the second operating position;

wherein the second member carries a gear and wherein the first member carries a pinion for drivingly rotating the gear and thus rotating the second member relative to the first member.

4. The vehicle according to claim 3 wherein the pinion is driven by a motor.

5. The vehicle according to claim 4 wherein the first member includes a substantially vertical plate and wherein the second member is mounted for said pivotal movement on the plate outside of the plate and wherein the motor is mounted inwardly of the plate with the shaft of the motor passing through the plate for engaging the gear of the second member.

6. The vehicle according to claim 5 wherein the second member comprises a hub having a main hub plate parallel to the plate of the first member with an annular rim attached to the main hub plate and projecting therefrom toward the plate of the first member, the gear being defined on a surface of the annular rim facing toward the axis.

7. The vehicle according to claim 6 wherein it is provided a spindle for the wheel mounted on the main hub plate so as to project outwardly therefrom away from the plate of the first member.

8. The vehicle according to claim 5 wherein the second member comprises a hub having a main hub plate parallel to the plate of the first member and wherein there is provided inter-engaging elements on the main hub plate and the plate for preventing twisting of the hub plate away from the plate when in the second operating position.

9. The vehicle according to claim 3 wherein there is provided on the first member a stop for locating the second member with the wheel axis in the second operating position just beyond bottom dead center such that vertical loads on the wheel tend to push the second member against the stop.

10. The vehicle according to claim 3 wherein the actuating means is arranged such that in the first raised position the wheel axis is substantially directly above the rotation axis and in the second operating position the wheel axis is moved through an angle substantially equal to 180 degrees such that the wheel axis is substantially directly below the rotation axis.

11. A vehicle comprising:

a vehicle frame having at least two longitudinal beams parallel to a direction of movement of the trailer;

at least two ground wheels for supporting the frame for movement across the ground;

and at least two mounting assemblies each associated with a respective ground wheel for attaching the ground wheel to the frame;

each mounting assembly comprising:

a first member connected to the frame for movement therewith;

and a second pivot member having the wheel mounted thereon for rotation about a wheel axis;

the second pivot member being pivotally movably mounted on the first member for pivotal movement relative thereto about a rotation axis parallel to and spaced from the wheel axis so as to move the wheel axis from a first raised position in which the frame is lowered to a position at or adjacent the ground to a second operating position lower than the first position in which the frame is raised for transport;

and means for actuating said pivotal movement between the raised position and the second operating position;

wherein the wheel axis in the second operating position is located just beyond bottom dead center;

and wherein there is provided on the first member a stop for locating the second member with the wheel axis in the second operating position just beyond bottom dead center such that vertical loads on the wheel tend to push the second member against the stop.

12. The vehicle according to claim 11 wherein the first member includes a plate and wherein the second member comprises a hub having a main hub plate parallel to the plate of the first member and wherein the stop member co-operates between the hub plate and the plate of the first member.

13. The vehicle according to claim 12 wherein there is provided inter-engaging elements on the main hub plate and the plate for preventing twisting of the hub plate away from the plate when in the second operating position.

14. The vehicle according to claim 11 wherein the actuating means is arranged such that in the first raised position the wheel axis is substantially directly above the rotation axis and in the second operating position the wheel axis is moved through an angle substantially equal to 180 degrees such that the wheel axis is substantially directly below the rotation axis.

* * * * *